United States Patent Office 3,819,831
Patented June 25, 1974

3,819,831
ANGIOTENSIN CONVERTING ENZYME IN-
HIBITOR-FRACTIONATED SNAKE VENOM
Miguel Angel Ondetti, North Brunswick, N.J., assignor
to E. R. Squibb & Sons, Inc., Princeton, N.J.
No Drawing. Continuation-in-part of abandoned application Ser. No. 837,888, June 30, 1969. This application
Sept. 21, 1971, Ser. No. 182,560
Int. Cl. A61k 17/00
U.S. Cl. 424—98                            4 Claims

ABSTRACT OF THE DISCLOSURE

Disclosed herein is a process for the fractionation of snake venom and the utilization of certain of the resultant fractions as angiotensin converting enzyme inhibitors.

RELATED APPLICATION

The present application is a continuation-in-part of copending application Ser. No. 837,888 filed June 30, 1969, now abandoned.

SUMMARY OF THE INVENTION

This invention relates to the fractionation of snake venom and the subsequent utilization of certain of these fractions as inhibitors for the conversion of a decapeptide (angiotensin I) to an octapeptide (angiotensin II).

BACKGROUND OF THE INVENTION

More and more, scientific evidence is being compiled to establish that the angiotensin II, an octapeptide, causes hypertension. This peptide is formed from a precursor decapeptide angiotensin I which is produced by the action of the enzyme renin on a substrate material known as angiotensinogen. It has now been discovered that fractions of snake venom can inhibit the formation of angiotensin II from angiotensin I.

The process disclosed herein can be applied to any crude form of snake venom. However, for purposes of convenience the procedure described herein relates to the venom of snakes belonging to the genus Bothrops.

DETAILED DESCRIPTION

Crude snake venom is processed and suspended in an alcoholic solution. This solution is then fractionated by passing it through a molecular sieve of the gel type. The bioactivity of each fraction from gel filtration is then determined and each active fraction then further fractionated first through a cation exchanger and thereafter through an anion exchanger. The bio-active fractions recovered by this latter fractionation are then subjected to partition and/or adsorption chromatography.

The fractionating procedures are carried out utilizing known techniques so as to collect those fractions which have U.V. absorption of from about 235 to about 300 m$\mu$, and to subject them to a bio-assay to determine their activity as angiotensin II inhibitors. Any suitable bio-assay test may be employed. Fractions showing the lowest $I_{50}$ are chosen for further fractionation and processing. One suitable test is that described in "A Simple Substrate for the Assay of Dog Lung Angiotensin Converting Enzyme," by D. W. Cushman and H. S. Cheung *Federation Proceedings*, 28, 799 (1969). Another is "Conversion of Angiotensin I to Angiotensin II by Cell-Free Extracts of Dog Lung," by Y. S. Bakhle, Nature, 220, 919. Still another is that described in an article entitled "Spectrophotomatic Assay and Properties of Angiotensin-Converting Enzyme of Rabbit Lung," by D. W. Cushman and H. S. Cheung, Biochemical Pharmacology, 20, 1637 (1971). After the fractions from gel filtration are recovered, the two which show the greatest activity are then fractionated through a cation exchange resin followed by recovery of the various fractions as stated above and testing of each fraction for bio-activity.

The fractions that show the best activity—that is, the lowest $I_{50}$—are then individually fractionated by partition and exchange chromatography to obtain the final active fractions of this invention. The $I_{50}$ is that concentration of peptides expressed in micrograms per ml., required to inhibit 50% of the activity of the angiotensin-converting enzyme. Following the procedure outlined, three bio-active fractions are recovered, labelled for purposes of convenience as Sheilacin, Jamacin, and Deanacin.

The final fractions of the invention which show high activity as inhibitors in the formation of angiotensin II from angiotensin I are peptides. The peptides' fractions can be identified by their chemical characteristics, e.g., paper chromatography, paper electrophoresis and amino acid compositions as established in the examples.

The alcoholic solution of crude Bothrops jararaca is prepared by first suspending 1 part of the snake venom in from about 5 parts to about 200 parts by weight of water and heating at a point below 100° C., preferably from between 85 to 98° C. for about 5 to about 30 minutes. The aqueous suspension is diluted with from about 5 to about 10 volumes of alcohol, filtered and washed. This procedure is preferred; however, other known methods of preparing an alcoholic extract of venom may be utilized.

The filtrate is concentrated in vacuo and the residue is passed through any molecular sieve which will fractionate peptides having a molecular weight of from about 200 to about 5,000 with the most preferred molecular sieves being those that extract peptides having molecular weights of from about 200 to about 2,600. The molecular sieves are gel filtration agents composed of modified dextrans crosslinked to give a 3-dimensional network of polysaccharide, or of polyacrylamides. They are available in the form of beads or spheres having a diameter of from 40 to 150 microns. Suitable molecular gel sieves are, for example, Sephadex G-25, Sephadex G-15, Bio-Gel P-2, and Bio-Gel P-4. Sephadex G-25 is a modified dextran molecular sieve in the form of beads having a diameter of from 50-150 microns and which is capable of fractioning compounds with a molecular weight between 1,000 and 5,000. Sephadex G-15 is a modified dextran molecular sieve in the form of beads having a diameter of from 40-120 microns and which is capable of fractionating compounds with a molecular weight up to 1,500. Bio-Gel P-2 is a spherical polyacrylamide gel suitable for the separation of molecules with a molecular weight up to 1,800. Bio-Gel P-4 is a spherical polyacrylamide gel suitable for the separation of molecules with a molecular weight up to 4,000.

The eluate from the molecular sieve is tested for angiotensin-converting inhibition and the active fractions are passed through a cation exchange resin, e.g., carboxymethyl cellulose; Dowex 50-W; Amberlite IRC-50; Amberlite IR-120, and the like. It is to be understood, however, that any cation exchange resin which will fractionate peptides on the basis of their net positive charge may be employed. Dowex 50-W and Amberlite IR-120 are synthetic cation exchange resins consisting of an ionizable sulfonic acid residue attached to an insoluble styrenedivinylbenzene, while Amberlite IRC-50 is a weakly acidic cation exchange resin of the acrylic type.

The eluate from the cation exchange resin is tested for angiotensin-converting inhibition and the active fractions are then passed through an anion exchange resin, e.g., DEAE Sephadex; DEAE Cellulose; Dowex 1; Amberlite IR-4B; Amberlite IRA 400, and the like. It is to be understood, however, that any anion exchange resin which will fractionate peptides on the basis of their net negative charge may be employed. DEAE Sephadex is a modified dextran anion exchange resin to which diethylaminoethyl functional groups have been attached, while DEAE Cellulose is a cellulose anion exchange resin to which diethylaminoethyl functional groups have been attached. Dowex 1 and Amberlite IRA 400 are strongly basic synthetic anion exchange resins consisting of a quaternary ammonium ionizable group attached to a styrenedivinylbenzene matrix, while Amberlite IR-4B is a weakly basic synthetic ion exchange resin of the polystyrene type.

After passing the active fractions through an anion exchange resin, the two active fractions having the lowest $I_{50}$ are selected for further processing. One fraction is subjected to partition chromatography to yield Jamacin and Deanacin and the other fraction is subjected to absorption chromatography to yield an active fraction called Sheilacin.

Each of these fractions can be formulated in injectable form so the active ingredient is from 0.1 to 10 mg. per kg. of body weight, the preferred dose range being from 1 to 5 mg. per kg. of body weight to be administered to mammalian host in four equal injections over the period of twenty-four hours.

The following examples are illustrative of the invention. All temperatures are in degrees Centigrade unless otherwise stated. The $I_{50}$ in Examples 2 and 3 is measured according to the procedure of Cushman et al., Federation Proceedings, supra. The designation "NI" in these examples indicates "No Inhibition."

Paper electrophoresis tests are run on Whatman No. 4 with a voltage gradient of 10–20 volt/cm. for a period of 30 to 180 minutes. Organic buffers containing 30% formamide are used. Mobilities are measured relative to a set of reference dyes (Apolon: 4[4'](2-hydroxyethyl)-phenylazo]-2'',2'''-(phenylimino)-diethanol; Amaranth: trisodium salt of 1-(4-sulfo-1-naphthylazo)-2-naphthol-3,6-disulfonic acid) The mobility of any compound in Am units is obtained by measuring the distance of the spot to the Apolon spot, dividing by the Amaranth-Apolon distance and multiplying by 100. The charge on the compound is indicated by a minus sign if it has moved in the same direction as Amaranth.

EXAMPLE 1

Preparation of Crude Alcoholic Snake Venom Extract

Crude *Bothrops jararaca* venom (10 gramss) is thoroughly suspended in water (1 liter) and heated for 15 minutes in a 97° C. water bath. After cooling to ambient temperature and diluting with 7500 ml. of absolute ethanol, the suspension is filtered through a Celite pad and the filtrate concentrated under vacuum to dryness. The residue is dissolved in water and freeze-dried. The solid residue is extracted with 90% ethanol several times (total volume 400 ml.). The combined ethanol extracts are diluted with 2 liters of ethyl ether. The precipitate formed is collected by centrifugation, dissolved in water (100 ml.) and freeze-dried. Yield 642 mg. The foregoing procedure is repeated to obtain additional crude extract.

EXAMPLE 2

Fractionation on Molecular Gel Sieve

Sephadex G–25 (360 g.) is suspended in 4 l. of 0.2 M acetic acid and allowed to swell for 3 hours. After 30 minutes deaeration *in vacuo* the slurry is poured into a column (5 cm. diameter, 100 cm. high) containing a small amount of 0.2 M acetic acid. The crude alcoholic extract of venom (1.3 g.) from Example 1 is dissolved in 0.2 M acetic acid (10 ml.) and applied to the top of the column. Elution is carried out with 0.2 M acetic acid. On the basis of the UV absorption at 280 m$\mu$, eleven pooled fractions are obtained which on removal of solvent yield the following quantities of solids:

| Fraction | Mg. | $I_{50}$ (in vitro) $\mu$g./ml. |
|---|---|---|
| 1 | 96 | 6.1 |
| 2 | 334 | 5.4 |
| 3 | 182 | |
| 4 | 219 | NI |
| 5 | 60 | NI |
| 6 | 14 | NI |
| 7 | 69 | 5.6 |
| 8 | 49 | NI |
| 9 | 0 | |
| 10 | 95 | NI |
| 11 | 2 | |

EXAMPLE 3

Fractionation on Cation Exchanger

Carboxymethylcellulose (Whatman CM–52) (100 g.) is suspended in 4 l. of 0.005 M ammonium acetate and allowed to stand ca. 20 minutes. The supernatant is decanted and the washing repeated six times in the same way. After deaeration a column is packed and washed with 0.005 M ammonium acetate. Fractions 2 and 3 from the Sephadex G–25 fractionation (516 mg.) are combined and dissolved in 0.005 M ammonium acetate (5 ml.) and applied to the top of the column. Elution is carried out with 0.005 M ammonium acetate and is monitored by UV absorption. All the tubes showing a significant UV absorption at 280 m$\mu$ are pooled, concentrated to dryness and freeze-dried. Yield 437 mg. (Fraction 1a). The column is then washed with 0.2 M acetic acid and the material thus eluted is recovered by freeze-drying the solvent. Yield: 25 mg. (Fraction 2a). This latter fraction is not utilized for further testing.

EXAMPLE 4

Fractionation on DEAE-Sephadex

DEAE-Sephadex (100 ml.) in the OH cycle is washed with 0.005 M ammonium bicarbonate (5 × 400 ml.) and placed in a column (15 cm. diameter-24 cm. length) after deaeration. The major portion of Fraction 1a from the CMC fractionation (417 mg.) of Example 3 is dissolved in 0.005 M ammonium bicarbonate (5 ml.) and applied to the top of the column. Elution is carried out with a linear gradient of ammonium bicarbonate (from 900 ml. of 0.005 M and 900 ml. of 1 M). The elution is monitored by UV absorption. Twelve pooled fractions are obtained showing significant UV absorption at 280 m$\mu$ which on removal of solvent yield the following quantities of solids:

| Fraction | Mg. | $I_{50}$ (in vitro) $\mu$g./ml. |
|---|---|---|
| 1b | 69 | 5 |
| 2b | 8 | 20 |
| 3b | 23 | NI |
| 4b | 39 | 0.6 |
| 5b | 48 | 2.3 |
| 6b | 8 | 10.4 |
| 7b | 26 | NI |
| 8b | 10 | NI |
| 9b | 75 | NI |
| 10b | 75 | NI |
| 11b | 33 | NI |
| 12b | 2 | |

EXAMPLE 5

Fractionation on Silica Gel

Fraction 5b from Example 4 (10 mg.) is applied to a thin layer plate of silica gel (20 x 20 cm.) in a streak 17 cm. wide and the plate run with methanol. After the solvent front has traveled a distance of approximately 18 cm., the plate is dried and observed under UV light. Two distinct bands [$R_f$ 0.42 (Fraction 1c); $R_f$ 0.17 (Fraction 2c)] are observed. The silica gel with each band is removed and washed with methanol. The solvent is evaporated to dryness. Yield Fraction 1c: ($I_{50}$: 0.9 $\mu$g./ml.); Fraction 2c: 3.9 mg. ($I_{50}$: 22 $\mu$g./ml.).

Analysis of 1c called Sheilacin for convenience is as follows:

Paper chromatography: Whatman paper 3 MM; descendant; $R_f$—0.58; solvent: n-butanol, pyridine, acetic acid, water (30:20:6:24).

Reactions of the chromatographic spots with specific reagents being:

| | |
|---|---|
| Ninhydrin | Neg. |
| Ehrlich | Pos. |
| Sakaguchi | Neg. |
| Pauly | Pos. | having an amino acid composition of:

| Amino acid: | ($\mu$moles/mg.) |
|---|---|
| Aspartic acid | 0.9 |
| Serine | 0.5 |
| Glutamic acid | 1.7 |
| Proline | 2.8 |
| Glycine | 0.3 |
| Isoleucine | 0.6 |
| Ammonia | 2.0 |
| Tryptophan | [1] 0.6 |
| Histidine | 0.6 |

[1] Determined by UV absorption.

Paper electrophoresis: According to the technique described in: L. N. Werum, H. T. Gordon, and W. Thornburg, J. Chromatog., 3, 125 (1960):

| pH: | AM values |
|---|---|
| 3.3 | +12 |
| 4.7 | 0 |
| 7.2 | −12 |
| 8.0 | −17 |
| 9.3 | −20 |

EXAMPLE 6

Fractionation by Partition Chromatography

Sephadex G–25 (50 g.) is allowed to swell in a mixture of n-butanol-pyridine-acetic acid-water (30:20:6:24) (500 ml.) for 3 hours. The suspension is deaerated and poured into a column of 1.5 cm. diameter and 95 cm. length. Fraction 1b from DEAE-Sephadex fractionation is dissolved in 1 ml. of the solvent mixture, and applied at the top of the column. The elution is carried out with the same solvent system and the 3 ml. fractions are scanned by Ehrlich reaction. Two bands with $R_f$ 0.66 (Fraction 1) ($I_{50}$=5 $\mu$g./ml.) and 0.53 (Fraction 2d) ($I_{50}$=3 $\mu$g./ml.) are observed, called Jamacin and Deanacin, respectively, for convenience.

These products have the following characteristics:

Jamacin: Paper chromatography: As set forth in Example 5; $R_f$—0.66; reactions of the chromatograph spots with reagents being:

| | |
|---|---|
| Ninhydrin | Neg. |
| Ehrlich | Pos. |
| Sakaguchi | Pos. |
| Pauly | Neg. | having an amino acid composition of:

| Amino acid: | ($\mu$Moles/mg.) |
|---|---|
| Threonine | 0.5 |
| Serine | — |
| Glutamic acid | 1.1 |
| Proline | 2.6 |
| Glycine | 0.1 |
| Isoleucine | 0.6 |
| Ammonia | 0.8 |
| Tryptophan | 0.5 |
| Arginine | 0.5 |

Paper electrophoresis: According to the technique set forth in Example 5:

| pH: | AM values |
|---|---|
| 3.3 | +11 |
| 4.7 | +1 |
| 7.2 | −2 |
| 8.0 | −4 |
| 9.3 | −4 |

Deanacin: Paper chromatography: As described in Example 5; $R_f$: 0.53; reactions of the chromatographic or electrophoretic spots being:

| | |
|---|---|
| Ninhydrin | Neg. |
| Ehrlich | Pos. |
| Sakaguchi | Pos. |
| Pauly | Neg. | having an amino acid composition of:

| Amino acid: | ($\mu$Moles/mg.) |
|---|---|
| Glutamic acid | 1.2 |
| Proline | 2.2 |
| Isoleucine | 0.6 |
| Ammonia | 1.8 |
| Tryptophan | [1] 0.5 |
| Arginine | 0.6 |

[1] Determined by UV absorption.

Paper electrophoresis: According to the technique set forth in Example 5:

| pH: | AM values |
|---|---|
| 3.3 | +11 |
| 4.7 | +1 |
| 7.2 | −2 |
| 8.0 | −4 |
| 9.3 | −4 |

EXAMPLE 7

Assays for Inhibition of the Angiotensin-Converting Enzyme (Cushman Article)

The inhibition studies employed a spectrophotomeric assay which measures the amount of hippuric acid produced by hydrolysis of hippuryl-L-histidyl-L-leucine, a synthetic converting enzyme substrate. Venom fractions are incubated for 3 hours at 37° C. in a 0.5 ml. assay mixture containing 0.1 M potassium phosphate buffer, pH 6.8, 1% NaCl, 5×10$^{-4}$ M hippurylhistidylleucine, and 200 $\mu$g. of a 70-fold purified dog lung converting enzyme preparation. After acidification with 0.5 ml. of 1.0 N HCl, the mixture is extracted with 1 ml. of n-octyl alcohol and the amount of hippuric acid formed is determined from the absorbance at 235 m$\mu$ of the octanol layer. Hippuric acid and hippurylhistidylleucine have equal extinction at 235 m$\mu$, but a much greater amount of hippuric acid is extracted into N-octanol ($\epsilon_{235}$ after extraction=3.4 mM.$^{-1}$cm.$^{-1}$). For determination of $I_{50}$ values the venom fractions are usually added to the assay mixtures at final concentrations of 0.1, 0.5, 2.0, 10.0 and 50 $\mu$g./ml. and the percent of converting enzyme activity is plotted vs the $\log_{10}$ of the concentration of the venom fraction to determine the concentration yielding 50% inhibition. The results are as recorded in the above examples.

EXAMPLE 8

Biological assays based on the converting enzyme—catalyzed conversion of [Asp]$^1$, [Ile]$^5$—angiotensin I to angiotensin II, as determined by contraction of the isolated rat colon, are performed in a similar manner. The assay mixture is identical except that the angiotensin I is added at 1.0×10$^{-4}$ M and the enzyme at 10 $\mu$g./0.5 ml.; the mixture is incubated 40 minutes and stopped by boiling.

The fractions that show inhibitory activity in these assays are also able to inhibit the hypertensive response of angiotensin I in rats, in the dose range of 1–5 mg./kg. The results are as set forth in the above examples.

What is claimed is:

1. A process for extracting bio-active fractions from *Bothrops jararaca* snake venom which comprises:
   (a) passing an alcoholic solution of said snake venom through a molecular sieve of the gel type that will fractionate peptides having a molecular weight of from about 200 to about 5000;
   (b) collecting the eluate of the snake venom having a UV absorption in the range from about 235 to about 300 mμ.
   (c) assaying the eluate for bio-activity as angiotensin converting enzyme inhibitor;
   (d) passing the active assayed eluate through a cation exchanger which will fractionate peptides on the basis of their net positive charge;
   (e) collecting the eluate having a UV absorption in the range of from about 235 to about 300 mμ.;
   (f) assaying the collected cation eluate for bioactivity as angiotensin I converting enzyme inhibitor;
   (g) passing the active assayed cation eluate through an anion exchanger which will fractionate peptides on the basis of their net negative charge; and
   (h) collecting the anion eluate having a UV absorption in the range from about 235 to about 300 mμ.

2. A fraction of *Bothrops jararaca* snake venom produced by the process of claim 1 and having the following characteristics: paper chromatography descendent; solvent—n-butanol, pyridine, acetic acid, water (30:20:6:24); $R_f$—0.66;

reactions of the chromatographic spots with specific reagents being:

Ninhydrin _____ Neg.
Ehrlich _____ Pos.
Sakaguchi _____ Pos.
Pauly _____ Neg.

paper electrophoresis by the Werum et al. technique:

pH:                                    AM values
3.3 _____ +11
4.7 _____ +1
7.2 _____ −2
8.0 _____ −4
9.3 _____ −4 and having an amino acid composition of:

Amino acid:                          (μmoles/mg.)
Threonine _____ 0.5
Serine _____ —
Glutamic acid _____ 1.1
Proline _____ 2.6
Glycine _____ 0.1
Isoleucine _____ 0.6
Ammonia _____ 0.8
Tryptophan _____ 0.5
Arginine _____ 0.5

3. A fraction of *Bothrups jararaca* snake venom produced by the process of claim 1 and having the following characteristics: paper chromatography descendant, solvent—n-butanol, pyridine, acetic acid, water (30:20:6:24); $R_f$—0.58;

reactions of the chromatographic spots with specific reagents being:

Ninhydrin _____ Neg.
Ehrlich _____ Pos.
Sakaguchi _____ Neg.
Pauly _____ Pos.

having an amino acid composition of:

Amino acid:                          (μMoles/mg.)
Aspartic acid _____ 0.9
Serine _____ 0.5
Glutamic acid _____ 1.7
Proline _____ 2.8
Glycine _____ 0.3
Isoleucine _____ 0.6
Ammonia _____ 2.0
Tryptophan _____ 0.6
Histidine _____ 0.6 paper electrophoresis by the Werum et al. technique:

pH:                                    AM values
3.3 _____ +12
4.7 _____ 0
7.2 _____ −12
8.0 _____ −17
9.3 _____ −20

4. A fraction of *Bothrups jararaca* snake venom produced by the process of claim 1 and having the following characteristics: paper chromatography descendant; solvent—n-butanol, pyridine, acetic acid, water (30:20:6:24); $R_f$—0.53;

reactions of the chromatographic or electrophoretic spots being:

Ninhydrin _____ Neg.
Ehrlich _____ Pos.
Sakaguchi _____ Pos.
Pauly _____ Neg.

having an amino acid composition of:

Amino acid:                          (μmoles/mg.)
Glutamic acid _____ 1.2
Proline _____ 2.2
Isoleucine _____ 0.6
Ammonia _____ 1.8
Tryptophan _____ 0.5
Arginine _____ 0.6 and paper electrophoresis by the Werum et al. technique:

pH:                                    AM values
3.3 _____ +11
4.7 _____ +1
7.2 _____ −2
8.0 _____ −4
9.3 _____ −4

References Cited

Bjork, W.: "J. Biol. Chem.," vol. 238 (1963), pp. 2487–90.

Bakhle, Y.: "Nature," vol. 220 (1968), pp. 919–20.

Hamburg et al.: "Experientia," vol. 13 (1957), pp. 489–90.

Cushman et al.: "Fed. Proceedings," vol. 28 (1969), p. 799.

VINCENT D. TURNER, Primary Examiner